July 24, 1951
C. E. ALLEMAN ET AL
METHOD AND APPARATUS FOR REMOVING
CONDENSIBLES FROM GASES
Filed Jan. 4, 1949
2,561,720
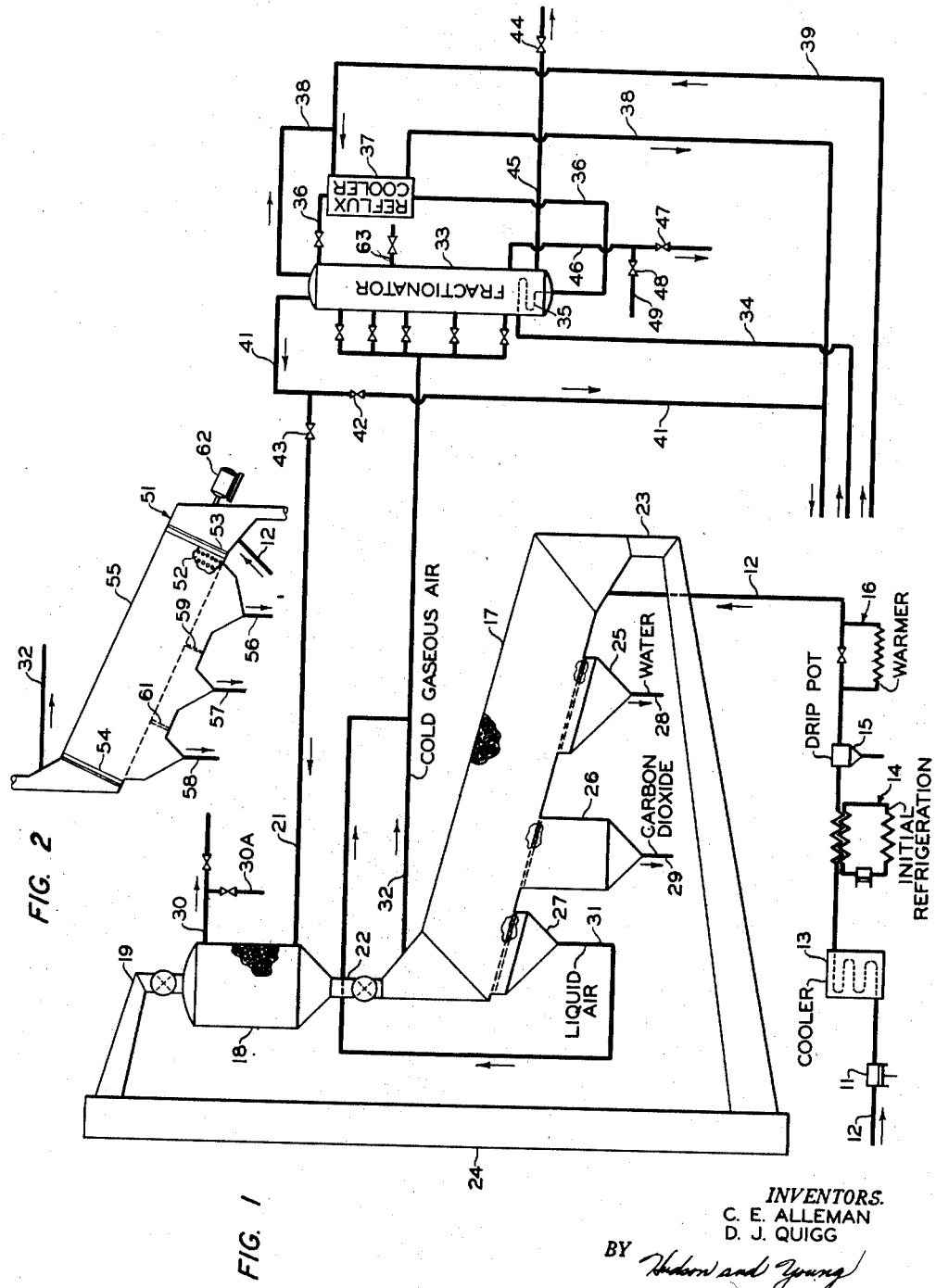
INVENTORS.
C. E. ALLEMAN
D. J. QUIGG
BY
ATTORNEYS

Patented July 24, 1951

2,561,720

UNITED STATES PATENT OFFICE 2,561,720

METHOD AND APPARATUS FOR REMOVING CONDENSABLES FROM GASES

Carl E. Alleman and Donald J. Quigg, Bartlesville, Okla., assignors to Phillips Petroleum Company, a corporation of Delaware Application January 4, 1949, Serial No. 69,182

14 Claims. (Cl. 62—122)

This invention relates to the production of relatively pure gaseous materials. In one of its more specific aspects it relates to an improved method for the continuous selective condensation of vapors from gases. In another of its more specific aspects it relates to the production of oxygen.

The principles of vaporization and condensation have long been used as means for the separation of materials. When preparing gases for low temperature separation, e. g., by fractionation, it is first necessary to remove certain impurities which are inherently present in practically all crude gases and which cause difficulties in the separation operation. Water and carbon dioxide form the greatest bulk of the impurities which hinder efficient separation of the components of air. Various methods including both high pressure and low pressure systems have been devised and utilized for the removal of these impurities, but these methods have generally required a substantially intermittent operation and in most cases have resulted in considerable contamination of the product streams.

An object of this invention is to provide a method for selectively condensing vapors from gases. Another object of the invention is to provide an improved low pressure system for condensing vapors from gases. Another object of the invention is to provide an improved method for producing high purity oxygen. Another object of the invention is to provide an improved system comprising only continuous operations for the production of oxygen. Another object is to provide an improved system for the continuous condensation of vapors. Another object of the invention is to provide an improved purifier chamber. Other and further objects and advantages will be apparent upon study of the accompanying disclosure and the drawings.

One of the gas separation processes which is most significant at present is the separation of the components of air. In order to remove the condensible impurities, such as water, carbon dioxide and various hydrocarbons, many processes have incorporated a separate chemical or physical absorption step. These require extra expense for equipment as well as for operation and, in the case of physical absorbents, require intermittent or cyclic operation in order to permit regeneration of the absorbent employed. Other processes remove the condensible impurities by lowering the temperature sufficiently to precipitate substantially all these impurities present. In such cases cyclic flow reversals, or changeovers from one chamber to another, often as frequently as every three minutes, are required to clean out the solids which have been precipitated. Even in the processes employing a separate absorption step, sufficient impurities carry over into the heat exchangers and settle out therein to require frequent reversals and even occasional shut-downs to permit cleaning out.

While these reversals usually entail only the switching of a valve or a pair of valves, there are a number of undesirable results inherent in such reversals. For instance, each time a flow-reversal or a change-over of chambers takes place, a chamber full of the incoming gas stream is picked up in the product stream. This places a slug of impurity in the product or requires that this slug of product be wasted in order to keep the product pure. If a reversal is effected for the purpose of permitting the product stream to clean up precipitated solids, these evaporated solids which are picked up by the product stream act as impurities therein. Not only are the product streams thus effected but other undesirable effects are imposed on the operation of the process. For instance, when reversing a heat exchanger, the reversal of flow cause temperature variations and severe pressure pulsations within the system. These temperature and pressure variations act to unbalance the operation of fractionators, expanders, and temperature controls. Each time the operation of such equipment is unbalanced a readjustment of the system is required which imposes a loss of efficiency both in power and in separation. Accumulators have been incorporated into some processes, particularly immediately upstream from the fractionator, in order to help smooth out temperature, pressure and flow variations incurred by the reversals or change-overs. Such accumulators, of course, demand extra space, expense of installation, and occasional maintenance expense.

In order to totally or in large measure remove the difficulties mentioned above, we have devised a method and a system to selectively condense vapors from gases in a continuous manner so as to eliminate the reversals, change-overs and fluctuations of other known systems. This invention is particularly described herein with reference to the production of oxygen from air. The invention is, however, quite adaptable to the purification of natural gas wherein it is necessary to remove heavier hydrocarbons, water, carbon dioxide, and hydrogen sulfide from the gaseous material. The system is also adaptable, among other uses, to the recovery of ethylene from cracked gasolines and for the separation of ethane and ethylene.

Our invention utilizes pebble cooler apparatus in which heat transfer has been found to be especially efficient. In such pebble cooler apparatus a flowing mass of solid heat exchange material is injected into the upper portion of a first heat exchange chamber and moves downwardly therethrough as a flowing contiguous porous mass. The solid heat exchange material is withdrawn ordinarily through one or more constricted outlets in the bottom of the first chamber and is passed into the upper portion of a second heat exchange chamber, usually below the first, in which second chamber a flowing contiguous porous mass of solid heat exchange material is formed. The solid heat exchange material is withdrawn from the lower portion of the second heat exchange chamber through one or more constricted outlets and is elevated to the upper portion of the first heat exchange chamber and is injected thereinto through a solid material inlet in the upper portion of that chamber. Each of the heat exchange chambers is provided with a gaseous material inlet in its lower portion and with a gaseous material outlet in its upper portion.

Solid heat exchange material utilized in such pebble cooler apparatus is generally known as pebbles. The term "pebbles" as used herein is used to denote any substantially solid material of flowable size and form which has sufficient strength to withstand mechanical pressures and temperatures encountered within the pebble cooler apparatus and which has a relatively high specific heat. These pebbles must be of such structure that they can carry large amounts of heat from one chamber to another without rapid deterioration or substantial breakage. Pebbles which may be satisfactorily used in this pebble cooler apparatus may be substantially spherical in shape, and range from about one-eighth inch to about one inch in diameter. Better heat transfer is obtained, however, when pebbles having a diameter of between one-eighth inch and about three-eighths inch are utilized. Materials which may be used singly or in combination in the formation of such pebbles include alumina, aluminum, nickel, cobalt, copper, iron, magnesia, and zirconia. Pebbles formed of such materials serve very well in pebble coolers of the type utilized in this invention, but preference is given to pebbles composed of nickel-steel and nickel-copper alloys.

Understanding of the invention will be facilitated upon reference to the accompanying discussion and the drawings. In the drawings, Figure 1 is a diagrammatic representation of a preferred form of our invention. Figure 2 is a schematic view of a preferred modification of the invention.

In a low pressure process for the production of oxygen as applied to the system diagramatically set forth as Figure 1 of the drawing, air is drawn into compressor 11 through line 12 and is passed by means of a continuation of line 12 through cooler 13 at a pressure ranging between about 2 psig and 10 psig. The heat of compression in the air is removed in cooler 13 and the compressed air is then passed by a further continuation of line 12 into a second heat exchange step in an initial refrigeration system 14. The air is cooled in the initial refrigeration system to a temperature within a few degrees of the frost point and any water which is condensed by that cooling is drained off in drip pot 15. The air which has become saturated by the cooling is passed, by means of a continuation of line 12, through warmer 16 in which the air is warmed slightly so that it is in at least a slightly unsaturated condition. The slightly unsaturated air is passed by means of line 12 into the lower end portion of purifier chamber 17. Pebbles are injected into the upper portion of vertically disposed pebble cooler chamber 18 through pebble inlet conduit 19 in the upper end portion thereof. The pebbles are gravitated downwardly through chamber 18 in direct heat exchange relation with a cold heat exchange gas which is injected into the lower portion of chamber 18 through conduit 21. Pebbles which are cooled in chamber 18 are gravitated from that chamber through pebble outlet conduit 22 and pass therethrough into the upper end portion of purifier chamber 17. Purifier chamber 17 is inclined from the horizontal at an angle of between 10° and 60°. It is preferred that the angle of inclination which chamber 17 is caused to assume be about 5° steeper than the angle of repose of pebbles to be utilized within the chamber. Our preferred angle generally falls within the range of from 30° to 50°. The pebbles gravitate downwardly and laterally through purification chamber 17 countercurrent to the flow of air flowing upwardly and laterally therethrough. The air and pebbles are contacted in a direct heat exchange relation in which the air is cooled so as to bring about the condensation of impurities therefrom and the pebbles are warmed thereby. The pebbles are gravitated from the lower portion of chamber 17 through pebble outlet conduit 23 and are transported by means of elevator 24 to the upper portion of pebble cooler chamber 18. In order to reduce gas leakage between the pebble cooler chamber and the purifier chamber, star valves or valves of a similar type may be employed in throats 19 and 22.

The bottom side of purifier chamber 17 is perforate so as to allow the passage of fluid therethrough but so as to prevent the passage of pebbles therethrough. Collection chambers 25, 26, and 27 are successively disposed upwardly along the bottom of purifier chamber 17 so as to enclose the perforate portions therein. Fluid outlets 28, 29 and 31, respectively, are provided in the lower portion of collection chambers 25, 26 and 27. As the unsaturated air from line 12 is passed into the lower end portion of chamber 17, liquid water which moistens the surface of the pebbles within the chamber is evaporated by the unsaturated air and is carried upwardly and laterally through the purifier chamber by the air stream. By this method of operation, only dry pebbles are permitted to pass from the purifier chamber to the upper portion of pebble cooler chamber 18. As the air ascends the chamber 17, it is successively cooled to temperatures, first, at which liquid water precipitates, second, to a temperature at which ice precipitates, third, to a temperature at which solid carbon dioxide precipitates, and finally, to a temperature at which part of the air itself is liquefied. Each of these precipitated or liquefied portions which is condensed is maintained in a zone by itself. As each of the precipitated portions collects in its zone, it gravitates directly downwardly to the lower side of purifier chamber 17. There it encounters the perforate wall section above mentioned through which it flows into its respective collection chamber.

Liquid water which is precipitated in its zone easily flows to the bottom side of the purifier chamber and through the perforate chamber portion into collection chamber 25. Any moisture remaining in the air is carried upwardly thereby through the mass of pebbles. The pebbles cool the air until the last of the moisture is converted to ice and ice forms on the surface of the pebbles. The ice covered pebbles move downwardly through the purifier chamber 17 until they reach a point where they are warmed enough by the ascending air to melt the ice. The water resulting from the melted ice adds to the collection of water. Thus, it is seen that the descending cold pebbles prevent any moisture from ascending beyond the water zone while the incoming unsaturated air stream prevents moisture from leaving the chamber with the pebbles. The water is withdrawn from collection chamber 25 by means of fluid outlet conduit 28.

The removal of carbon dioxide is accomplished in much the same manner as that decribed in the removal of water from the air. The main difference in the manner of removal of carbon dioxide to that used in the removal of water is that no liquid is encountered in the carbon dioxide separation at low pressures. The carbon dioxide is precipitated as a solid on the pebbles. As the pebbles descend, they are warmed by the air until the solid carbon dioxide (dry ice) sublimes and forms a layer of carbon dioxide-rich gas. Since the carbon dioxide thus sublimed is slightly colder than the ascending air and since it is more than half again as heavy as the air, it flows directly downward similar to the flow of liquid passing through the perforate bottom portion of purifier chamber 17 and collects in the carbon dioxide collection chamber 26. As the concentration of carbon dioxide gas in the air stream increases at this point, the point of dry ice formation moves downward a little and becomes rather sharply defined as large particles of solid carbon dioxide form on the surface of the pebbles. Some of the solid carbon dioxide is knocked loose from the pebbles and falls to the side of the chamber as a solid and is collected in the carbon dioxide collection chamber as fine particles which later sublime. It is also possible and sometimes desirable to operate so that all of the carbon dioxide is thus removed as a solid. With either manner of operation the carbon dioxide is confined to its zone by the action of the pebbles and the air in the same manner as is the water. Gaseous carbon dioxide is removed from the lower portion of collection chamber 26 through fluid outlet conduit 29.

As the air stream passes further up the chamber, a portion of the stream becomes liquefied and flows downwardly through the pebble bed and through the perforate bottom portion of purifier chamber 17 into liquid air collection chamber 27. Cold gaseous air is removed from the upper portion of chamber 17 through effluent outlet conduit 32. Liquid air is withdrawn from the lower portion of collection chamber 27 and is passed by means of conduit 31 to a point in line 32 in which the cold gaseous air is combined with the liquid air stream. The combined air stream is then passed into fractionator 33 at a point intermediate its ends. In fractionator 33 the air stream is fractionally distilled in a conventional manner so as to separate the nitrogen and oxygen constituents. A sufficient number of plates is provided in fractionator 33 so that nearly pure nitrogen is passed overhead and nearly pure oxygen is removed from the reboiler fractionator.

Relatively high pressure gaseous nitrogen at just above its dew point is passed from an external compression system through conduit 34 and into coil 35 in the lower portion of fractionator 33 where it passes in indirect heat exchange relation with the liquid oxygen fraction in the reboiler. In the indirect heat exchange between the oxygen fraction and the nitrogen from the compression system, the oxygen fraction is boiled and the nitrogen is condensed. The nitrogen condensate is removed from coil 35 through conduit 36 and is passed in indirect heat exchange relation in reflux cooler 37 with a first portion of the overhead nitrogen fraction which is removed from fractionator 33 through conduit 38. The nitrogen condensate is then passed by means of a continuation of line 36 into the upper portion of fractionator 33 where it is flashed to provide nitrogen reflux and aid in the cooling of materials within the fractionator 33. The portion of the overhead nitrogen fraction which acts as the cooling agent in reflux cooler 37 is taken to the above mentioned external compression system by means of a continuation of line 38. A major portion of this nitrogen returns under considerable pressure from the compression system and goes to the reboiler coil 35 by way of conduit 34 to complete its compression cycle. The remaining portion of nitrogen from the compression system is expanded and completes its compression cycle by returning through conduit 39 to reflux cooler 37 where it aids in cooling the reflux stream. Cooling which is needed to compensate for all heat leaks in the system is supplied by this external nitrogen compression and expansion cycle.

A second portion of the overhead nitrogen fraction is removed from the fractionator by way of conduit 41 and is divided into two streams. The smaller stream is passed to a point in conduit 38 as makeup to the external compression system while the major stream goes through conduit 21 as coolant for the solid heat exchange material in pebble cooler chamber 18. Regulation of these two streams is accomplished by setting valves 42 and 43 to obtain the desired flow relationship. By regulating this makeup stream to the external compression system, a wide range in the amount of cooling for the fractionator is possible without varying the temperature differentials for which the system is designed, thus making possible a very flexible operation of the fractionator. Nitrogen from the upper portion of chamber 18 is passed by means of conduit 30 to the exterior of the cooler chamber. A portion of the nitrogen may be drawn off through conduit 30A, returned to the compression system and recycled by way of fractionator 33 to chamber 18, in order to provide greater flexibility in the operation of the pebble cooler system. This recycle stream going through conduit 30A does not interfere with the operation of the compression system since all troublesome impurities are removed and kept removed by purifier chamber 17 and its method of operation according to our invention.

If oxygen in the liquid state is desired with the maximum purity available from the fractionator, valve 44 may be opened so as to pass the oxygen directly to a disposal point by way of conduit 45, thus wasting its cooling capacity. Oxygen in the gaseous state and of maximum purity may be obtained through conduit 46 by opening valve 47.

Our system may be modified as shown in the device of Figure 2 of the drawing. Purifier chamber 51 may be adapted so that a portion of the chamber may be rotated or vibrated so as to increase the flow of pebbles therethrough. In the modification shown in Figure 2 of the drawing, rotatable chamber portion 52 is sealed at its ends by seals 53 and 54. Chamber portion 52 may be perforate around its entire circumference and along its entire length. When such construction is utilized, collection chamber 55 extends from seal 53 to seal 54 and encloses the entire perforate chamber portion. The bottom portion of collection chamber 55 is provided with fluid outlet conduits 56, 57 and 58 through which water, carbon dioxide and liquid air, respectively, are removed in process for the production of oxygen. Collection chamber 55 may be provided with movable partitions 59 and 61 which may be used to regulate the length of the individual collection chambers served by outlets 56, 57 and 58. Unsaturated compressed air is passed into the lower end portion of purifier chamber 51 through inlet conduit 12 and cold gaseous air is removed from the upper portion of chamber 51 through conduit 32. Perforate chamber portion 52 may be rotated by rotator 62.

Argon, a valuable inert gas which is one of the components of air, may be obtained as a by-product of such an oxygen system. An argon-rich stream may be withdrawn from a point intermediate the ends of the fractionator through line 63 inasmuch as the boiling point of the argon lies between nitrogen and oxygen. The argon may be recovered from the argon-rich stream.

Various other modifications and advantages of this invention will be apparent to those skilled in the art upon study of the accompanying disclosure and the drawings. Those apparent modifications may be made without departing from the spirit or scope of this disclosure.

We claim:

1. A method of separating condensible vapors from gases which comprises the steps of passing a slightly unsaturated gas feed stream into the lower end portion of a purification zone; cooling solid heat exchange material in a first heat exchange zone; passing said cooled solid heat exchange material into the upper portion of said purification zone and gravitating said material downwardly and laterally therethrough; passing said gas feed stream upwardly and laterally countercurrent to said cooled solid heat exchange material, whereby successive condensible materials are condensed in successive portions of said purification zone; withdrawing said condensed materials from said successive portions of said purification zone; gravitating said solid heat exchange material from the lower end portion of said purification zone; removing uncondensed gases from the upper end portion of said purification zone; and passing said solid heat exchange material into the upper portion of said first heat exchange chamber.

2. A method of producing relatively pure oxygen which comprises the steps of compressing air; cooling said air to a temperature slightly above its frost point; removing water which is condensed by said cooling; warming said air to a temperature slightly above its saturation point; injecting said slightly unsaturated air as a feed into the lower end portion of at least one purification zone; cooling solid heat exchange material in at least one first heat exchange zone; passing said cooled solid heat exchange material into the upper portion of said purification zone and gravitating said material downwardly and laterally therethrough; passing said air feed upwardly and laterally countercurrent to said cooled solid heat exchange material, whereby water, carbon dioxide, and liquid air are successively condensed in successive portions of said purification zone; withdrawing said condensed materials from said successive portions of said purification zone; passing said withdrawn liquid air into a low temperature fractionation system comprising at least one fractionator; separating cold oxygen-rich and nitrogen-rich fractions in said fractionation system; passing cold gas from said fractionation system into the lower portion of each said first heat exchange zone and upwardly therethrough; removing gaseous effluent material from the upper portion of said first heat exchange zone; removing solid heat exchange material from the lower end portion of said purification zone; and passing said solid heat exchange material into the upper portion of said first heat exchange zone.

3. A vapor separation system which comprises in combination at least one vertically disposed closed outer shell; an inclined closed outer shell disposed below each said vertically disposed shell at an angle of between 10° and 60° from the horizontal and being perforate at least in its bottom side so as to provide fluid communication therethrough; at least one collection chamber adjacent and enclosing said perforate portion of each inclined shell; a solid material conduit connecting the lower portion of said vertically disposed shell to the upper end portion of said inclined shell; a first gaseous material inlet in the lower end portion of said inclined shell; a first gaseous material outlet in the upper portion of said inclined shell; a second gaseous material inlet in the lower portion of said vertically disposed shell connecting said vertically disposed shell to a refrigeration material supply source; a second gaseous material outlet in the upper portion of said vertically disposed shell; an elevator connecting said solid material outlet conduit of said inclined shell and said solid material inlet conduit of said vertically disposed shell; a feed conduit connected to said first gaseous material inlet conduit; a refrigerator in heat exchange with said feed conduit; a warmer in said feed conduit downstream of said refrigerator; a liquid separator in said feed line intermediate said refrigerator and said warmer; and at least one fluid material outlet in the bottom side of said collection chamber.

4. The vapor separation system of claim 3, wherein said collection chamber is partitioned so as to form three chamber sections disposed successively upwardly along the length of said inclined shell and enclosing said perforate portion of said shell.

5. A vapor separation system which comprises in combination at least one vertically disposed closed outer shell containing fluent solid heat exchange material; an inclined closed outer shell containing fluent solid heat exchange material disposed below each said vertically disposed shell at an angle of between 10° and 60° from the horizontal and being perforate in its bottom side so as to provide fluid communication therethrough; three collection chambers successively disposed along the bottom of said inclined shell so as to enclose said perforate shell portion therein; a solid material conduit connecting the lower portion of said vertically disposed shell to the upper end portion of said inclined shell; a first gaseous material inlet in the lower end portion of said inclined shell; a first gaseous material outlet in the upper portion of said inclined shell; a second gaseous material inlet in the lower portion of said vertically disposed shell; a second gaseous material outlet in the upper portion of said vertically disposed shell; an elevator connecting said solid material outlet conduit of said inclined shell and said solid material inlet conduit of said vertically disposed shell; a feed conduit connected to said first gaseous material inlet conduit; a refrigerator in heat exchange with said feed conduit; a warmer in said feed conduit downstream of said refrigerator; a liquid separator in said feed line intermediate said refrigerator and said warmer; a fluid material outlet in the bottom side of each said collection chamber; a low temperature fractionator; a fluid conduit connecting the fluid material outlet of the collection chamber nearest the upper end of said inclined shell and a point in said fractionator intermediate its ends; and at least one gaseous material conduit connecting said fractionator and said second gaseous material inlet of each said vertical chamber.

6. The vapor separation system of claim 5, wherein said inclined chamber is disposed at an angle of between 30° and 50° from the horizontal.

7. The vapor separation system of claim 6, wherein said inclined chamber is disposed at an angle between 5° and 10° greater than the angle of repose of solid material used therein.

8. The vapor separation system of claim 5, wherein said inclined chamber is disposed at an angle of between 15° and 30°; and rotation means are operatively connected to said inclined chamber so as to rotate said inclined chamber.

9. A low pressure condensation system comprising in combination an upright cooler chamber having a solid material inlet in its upper end and a solid material outlet in its lower end; gaseous material inlet means in one end of said cooler chamber; gaseous material outlet means in the end of said cooler opposite said gaseous material inlet means; a purifier chamber comprising in combination a shell, said shell being inclined at an angle from the horizontal between 10° and 60° and being perforate at least along its bottom side, at least one collection chamber adjacent and enclosing the ends of said shell and said perforate shell portion, at least one fluid outlet conduit in the lower portion of said collection chamber, solid material inlet means extending between the upper end portion of said collection chamber and the solid material outlet means of said cooler chamber, effluent outlet means in the upper end portion of said collection chamber, solid material outlet means in the lower end portion of said collection chamber, and gaseous material inlet means in the lower end portion of said collection chamber; and elevator means extending between said solid material outlet means of said collection chamber and said solid material inlet of said cooler chamber.

10. The low pressure condensation system of claim 9, wherein said purified chamber is inclined from the horizontal at an angle between 30° and 50°.

11. The low pressure condensation system of claim 9, wherein said purifier chamber is inclined from the horizontal at an angle between 10° and 35° and said shell is at least partially rotatable.

12. The purifier chamber of claim 11, wherein rotation means are provided in operative communication with said shell for at least partial rotation of said shell.

13. The method of claim 2, wherein an argon-rich fraction is separated from said oxygen-rich and nitrogen-rich fractions in said fractionation system.

14. The method of claim 2, wherein oxygen is recovered from the lower portion of at least one fractionator of said system.

CARL E. ALLEMAN.
DONALD J. QUIGG.

REFERENCES CITED

The following references are of record in the file of this patent:

UNITED STATES PATENTS

| Number | Name | Date |
| --- | --- | --- |
| 1,139,484 | Bryan | May 18, 1915 |